(12) United States Patent
Dayan et al.

(10) Patent No.: US 10,242,009 B2
(45) Date of Patent: *Mar. 26, 2019

(54) AUTOMATIC ANALYSIS OF REPOSITORY STRUCTURE TO FACILITATE NATURAL LANGUAGE QUERIES

(71) Applicant: International Business Machines Corporation, Armonk, NY (US)

(72) Inventors: Yigal S. Dayan, Jerusalem (IL); Josemina M. Magdalen, Jerusalem (IL); Irit Maharian, Tzur Hadasa (IL); Victoria Mazel, Jerusalem (IL); Oren Paikowsky, Jerusalem (IL); Andrei Shtilman, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 203 days.

This patent is subject to a terminal disclaimer.

(21) Appl. No.: 15/139,885

(22) Filed: Apr. 27, 2016

(65) Prior Publication Data

US 2017/0011050 A1 Jan. 12, 2017

Related U.S. Application Data

(63) Continuation of application No. 14/791,796, filed on Jul. 6, 2015.

(51) Int. Cl.
*G06F 17/30* (2006.01)

(52) U.S. Cl.
CPC .............. *G06F 17/30073* (2013.01)

(58) Field of Classification Search
CPC ................................ G06F 17/30073
See application file for complete search history.

(56) References Cited

U.S. PATENT DOCUMENTS

| 5,265,065 A | 11/1993 | Turtle |
| 5,519,608 A | 5/1996 | Kupiec |
| 6,014,661 A * | 1/2000 | Ahlberg ............ G06F 17/30572 |

(Continued)

OTHER PUBLICATIONS

Yang, "An ontological website models-supported search agent for web services", Expert Systems with Applications: An International Journal, vol. 35 Issue 4, Nov. 2008, pp. 2056-2073.

(Continued)

*Primary Examiner* — Jensen Hu
(74) *Attorney, Agent, or Firm* — Joseph Polimeni; Edell, Shapiro & Finnan, LLC

(57) ABSTRACT

Techniques for analyzing a repository are described herein. A method for analyzing a repository may include obtaining a list of known persons in a repository based on objects, users, and groups retrieved from the repository. The method may further select one of the objects having a field and a value, and then determine whether the field of the selected object is a facet based on a probability that the field of the selected object has a limited number of possible values. In analyzing the repository, a repository information archive may be generated. The repository information archive may include the relationship between the selected object and at least one other object, statistics and counts related to properties in the selected objects, and whether or not the field of the selected object is a facet.

9 Claims, 5 Drawing Sheets

(56) References Cited

U.S. PATENT DOCUMENTS

| | | | |
|---|---|---|---|
| 2005/0203929 A1* | 9/2005 | Hazarika | G06F 17/3053 |
| 2006/0230012 A1* | 10/2006 | Ruvolo | G06F 17/30702 |
| 2009/0083418 A1* | 3/2009 | Krishnamurthy | G06Q 10/10 709/224 |
| 2009/0125329 A1* | 5/2009 | Kuo | G06Q 10/10 705/3 |
| 2009/0182738 A1 | 7/2009 | Marchisio et al. | |
| 2011/0144995 A1 | 6/2011 | Bangalore et al. | |
| 2013/0212092 A1 | 8/2013 | Dean et al. | |
| 2014/0172872 A1* | 6/2014 | Hyatt | G06F 17/30604 707/741 |

OTHER PUBLICATIONS

Tablan et al., "A Natural Language Query Interface to Structured Information", Lecture Notes in Computer Science, vol. 5021, 2008, pp. 361-375.

Androutsopoulos et al., "Natural Language Interfaces to Databases—An Introduction", Mar. 16, 1995, 50 pages.

Yang, "An Ontology-Supported Website Model for Web Search Agents", Accepted for presentation in 2006, International Computer, Taipei, Taiwan, Dec. 2006. Quoted in Proceedings of the 2007 WSEAS International Conference on Computer Engineering and Applications, Gold Coast, Australia, Jan. 17-19, 20.

List of IBM Patents or Patent Applications Treated As Related, Apr. 27, 2016.

\* cited by examiner

100

AUTOMATIC ANALYSIS OF REPOSITORY STRUCTURE TO FACILITATE NATURAL LANGUAGE QUERIES

CROSS-REFERENCE TO RELATED APPLICATIONS

This application is a continuation of U.S. patent application Ser. No. 14/791,796, entitled "Automatic Analysis of Repository Structure to Facilitate Natural Language Queries" and filed Jul. 6, 2015, the disclosure of which is incorporated herein by reference in its entirety.

BACKGROUND

Repositories hold data such as emails, text documents, executable files, and the like. This data may be retrieved from the repository in response to a query. The process of retrieving this data in a fast, precise, and accurate way can become more difficult based, in part, upon how much data may be stored in the repository.

SUMMARY

According to one embodiment of the present invention, a method for analyzing a repository includes obtaining a list of known persons in a repository based on objects, users, and groups retrieved from the repository. The method may further select one of the objects having a field and a value, and determine whether the field of the selected is searchable, contains special values, or is a facet, where the field is defined as a facet based on a probability that the field of the selected object has a limited number of possible values. The method may also count a number of documents to contain a property for each property retrieved from a repository and generate a repository information archive. The repository information archive may include a persons matrix, the relationship between the selected object and at least one other object, statistics and counts related to properties in the selected objects, and whether or not the field of the selected object is a facet and a distribution of values in a facet.

DETAILED DESCRIPTION

The subject matter disclosed herein relates to techniques for comprehensive analysis of a repository structure. Retrieving data from a large document repository based on queries can be a serious challenge.

For example, a growing number of queries on databases and repositories are Natural Language (NL) queries, and may be made with human speech and phrasing. A request originating from a speech based NL query may have a large number of possible meanings for each of its words. This results in a huge number of combinations that could map to a large number of queries. Retrieving results based on identifying a collection of the words, as interpreted from the NL query, may be prone to errors and also may be very imprecise. A paradigm based on a collection of words for query access to repositories may lead to large recall and low precision.

In the present disclosure, a repository may be analyzed to improve precision of query results. In one example, static analysis may be performed on the repository in order to generate an information structure to be used in interpreting queries and query retrieval processes. Static analysis may be static in its performance prior to the execution of a set of queries on the repository.

The output of this repository analysis may be a repository information archive which may represent the repository structure entities. The repository information archive may be used to aid in interpreting queries, executing queries on the repository, or may provide repository structure information as needed. The repository information archive may be an extensible markup language (XML) document and extensible hypertext markup language (XHTML) document, or any other markup language document that includes the structural information that may have been gained through repository analysis. Other information may also contribute to the repository information archive or its use, including related information about repository users found in data external to the repository such as in a lightweight directory access protocol (LDAP) or other external information relevant to the analyzed repository information. Each of these pieces of information may contribute to a boost in accuracy as the query interpretation can be more tightly coupled with the specific repository structure information than an interpretation that would otherwise occur. In some examples, the repository information archive may be used to aid in interpretation of queries in written form as well as queries received in the form of NL or human speech. The comprehensive analysis performed on the repository may aid in converting a NL query into a structured query that includes user specific patterns and repository specific structure to yield more accurate results to the query.

Figure 1:
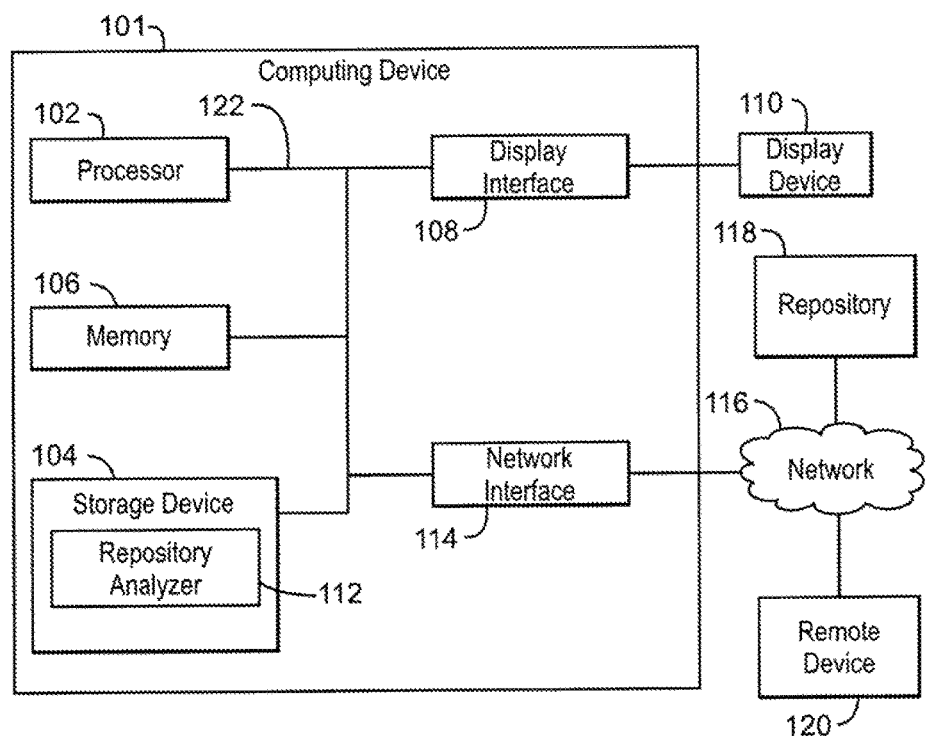
FIG. 1 shows a block diagram of an example computing system to analyze a repository.

FIG. 1 shows a block diagram of an example computing system 100 to analyze a repository. The computing system 100 may include a computing device 101 having a processor 102, a storage device 104 comprising a non-transitory computer-readable medium, a memory device 106, a display interface 108 communicatively coupled to a display device 110. The processor 102 may be a main processor that may be adapted to execute the stored instructions. The processor 102 may be a single core processor, a multi-core processor, a computing cluster, or any number of other configurations. The memory unit 106 can include random access memory, read only memory, flash memory, or any other suitable memory systems. The main processor 102 may be connected through a system bus 122 to components including the memory 106, the storage device 104, and the display interface 108. The display device 110 may be an external component to the computing device 101, an integrated component of the computing device 101, or any combination thereof.

The storage device 104 may include a repository analyzer 112 to generate a repository information archive. The computing device 101 may include a network interface 114 communicatively coupled, via a network 116, to a repository 118 and a remote device 120. In an example, the repository analyzer 112 may be configured to retrieve repository users and groups. The retrieval of this information may be used to analyze the frequency of user associations with other users groups and concepts. Further, knowledge of a particular use of any given user, interactions, history of use, as well as information associated with an occurrence of data indicating a given user in various fields in the repository such as: Sent-to, To, Creator, etc. may aid in analysis of user relationships to other users and may help with error correction in both generation of the query and correction of speech queries. For example, for a search on "Mary Poppins" a first search may be done to determine if "Mary Poppins" exists in a "from" or "to" field of objects in the repository. If not, then the phrase "Mary Poppins" may not be searched as a name of a user, but instead as a string without any associated significance as being a name.

In an example, the repository analyzer 112 may be used by a computing device 101 to generate a persons matrix. In a persons matrix, a repository analyzer 112 may obtain for each user in the repository 118, a list of contacts. In one example, the repository analyzer 112 may also include a count of other additional users that a particular user may send and receive emails from. In query interpretation, a repository structured with this information may provide more accurate results. In an example, additional user information of a repository may be analyzed including information about collaboration of one or more users to generate the data in the repository.

The repository analyzer 112 may be logic or a logical unit that at least partially includes hardware to implement the logic and processes it may be storing. The repository analyzer 112 may be implemented as discrete modules performing various functions, an integrated module of a parent process, or any combination thereof. In embodiments, the repository analyzer 112 may be implemented as instructions executable by a processing device, such as the processor 102. The instructions may direct the processor 102 to identify a data flow source statement within a computer program and identify a feature read at the source statement. The feature may include structure and values for a repository of documents. For example, the structure information and generated repository information archive may include various authors of the documents, when they were generated, modified, or other structural data about not only the repository, but also the objects and fields in that repository.

The block diagram of FIG. 1 is not intended to indicate that the computing device 101 is to include all of the components shown in FIG. 1. Further, the computing device 101 may include any number of additional components not shown in FIG. 1, depending on the details of the specific implementation.

Figure 2:
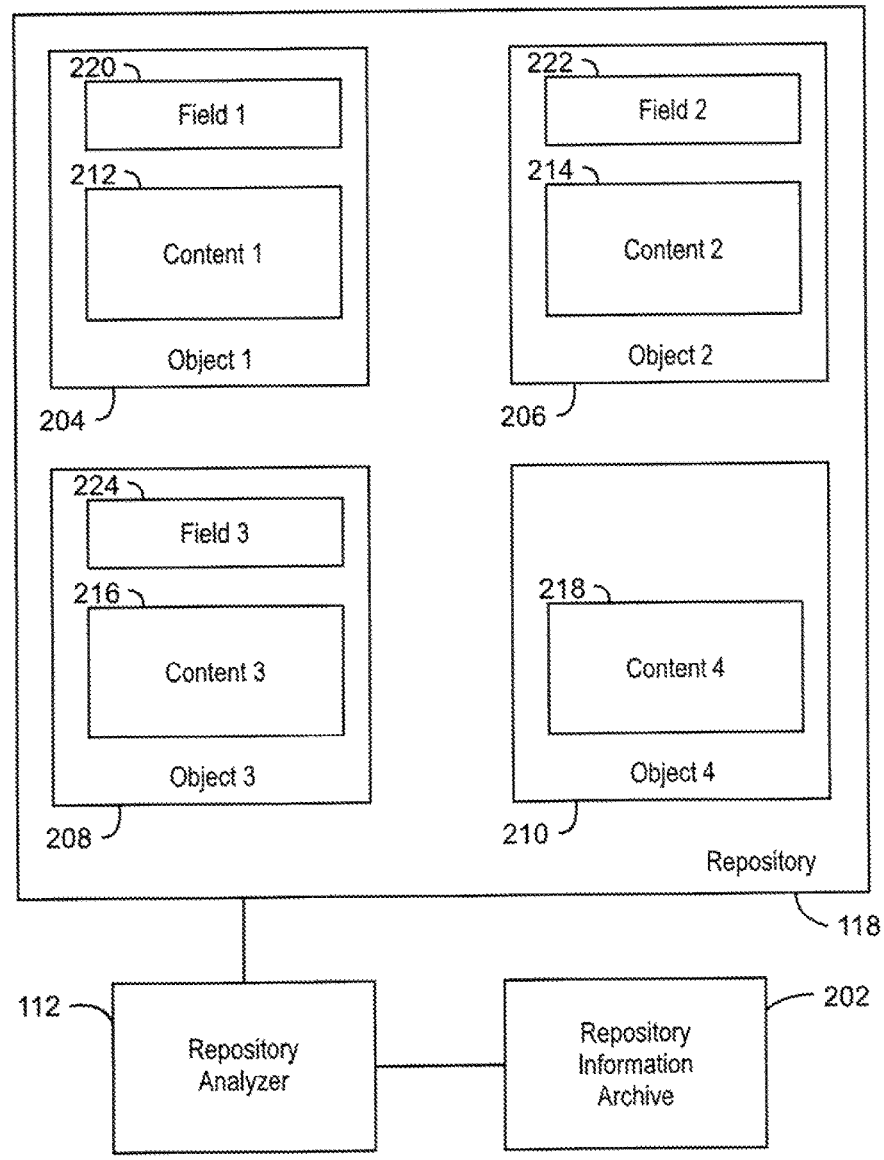
FIG. 2 shows a block diagram of an example repository to be analyzed.

FIG. 2 shows a block diagram 200 of an example repository 118 to be analyzed. As illustrated in FIG. 2, a repository, such as the repository 118 of FIG. 1, may be accessible to a repository analyzer, such as the repository analyzer 112 of FIG. 1, to generate a repository information archive 202. The repository information archive 202 may contain structural information about the repository 118 as well as other results from the repository analyzer 112.

As illustrated in FIG. 2, the repository 118 may include multiple objects (Object 1 204, Object 2 206, Object 3 208, and Object 4 210). Like items are as described in FIG. 1. These objects 204, 206, 208,210 may be any collection of data stored in the repository 118 and may include text, documents, emails, temporary files, executable files, databases, spreadsheets, presentations, or any other collection of data that may be stored in the repository 118. Each of the pictured objects 204-210 may each contain data that is here referred to as content (Content 1 212, Content 2 214, Content 3 216, and Content 4 218). In an example, content data may be data to provide text, images, or other suitable information for an end-user. Content can include the text of a text document, the video of a video file, the message of an email, or other similar information. Each object 204, 206, 208, 210 may also contain a field (Field 1 220, Field 2 222, Field 3 224). In an example, the fields 220-224 may include information about their corresponding objects 204, 206, 208 or their corresponding contents 212, 214, 216. In an example, the fields 220, 222,224 may include metadata about the corresponding objects 204, 206, and 208 and contents 212, 214, and 216. As illustrated in FIG. 2, Object 4 210 does not include a field, as objects 204, 206, 208, and 210 may vary in structure. The various fields that are present in both the repository 118 as a whole and within each object 204, 206, 208, 210 may be analyzed by the repository analyzer 112 to generate the repository information archive 202.

The repository analyzer 112 may also analyze each object 204, 206, 208, 210 to find and catalog the properties of each object 204, 206, 208, 210. The repository analyzer 112 may also determine which, if any of the object's properties are "searchable," contain special characters, or may be used in future queries. In an example, the repository analyzer 112 may also detect relations between objects 204, 206, 208, 210. All of this information or any combination of it may be used in the generation of the repository information archive 202 to aid in formation of semi-structured queries.

In another example, each field 220, 222, 224 of a corresponding object 204, 206, 208 may be a facet. A field may be considered a facet if the values in a field are limited to either a pre-defined choice list or if a limited number of values populate the field throughout the repository and these values make up a majority of the values possible in the field. For example, Object 1 204 may be an email and the email includes content 1 212 that may be a message of text. In this example, Object 1 204 may also include Field 1 220 that may be a "sent by:" field to indicate a user that the email was sent by. A repository analyzer 112 may then determine if a "sent by:" field qualifies as a facet by a determination of if the number of users for a repository 118 may be limited. In this example, if the possible options for Field 1 220 (as a "sent by" field") may be limited or finite, then Field 1 220 may be considered a facet. In contrast, Field 2 222 may be a "date created" field to indicate when Object 2 206 was created. In this example, the possible options for this field, i.e. days, are not finite for the repository. In this example, a "date created" may not be considered a facet.

In some examples, however, a field 220, 222, 224 may be considered a facet if it may be facet-like or bears sufficient similarity to a field that may be a facet. In an example, a field 220, 222, 224 may be facet-like if the values are finite in a specific repository 118. For example, while the number of days that are possible in a "date created" field are not limited, a repository analyzer 112 may determine that all of the values of the "date created" fields for each object 204, 206, 208, 210 in the repository 118 are within a certain range and are therefore limited. In this example, the "date created" field may be considered a facet. In an example, the determination of if a field 220, 222, 224 may be a facet or not may be included in the repository information archive and used in query interpretation and execution on the repository 118. In example, a field 220, 222, 224 may also be considered a facet by determination if the field values are limited to a pre-defined list of options or a de facto limited list calculated by looking at the specific content of the repository 118. Analysis of the specific content of the repository 118 may include counting the number of documents containing this property, the number of documents containing this value, and other similar measures.

The repository analyzer 112 may count various features of the repository 118. In an example, the repository analyzer 112 may count the number of objects 204, 206, 208, 210 to contain not only a field, but also how many contain a particular type of field. This information may be structured, put into the repository information archive, and may help with ranking and scoring a query by excluding search terms that would not normally return any results from the repository 118. For example, a counted number of properties may help provide a denominator for calculating the likelihood of asking for a particular property in a query.

Figure 3:
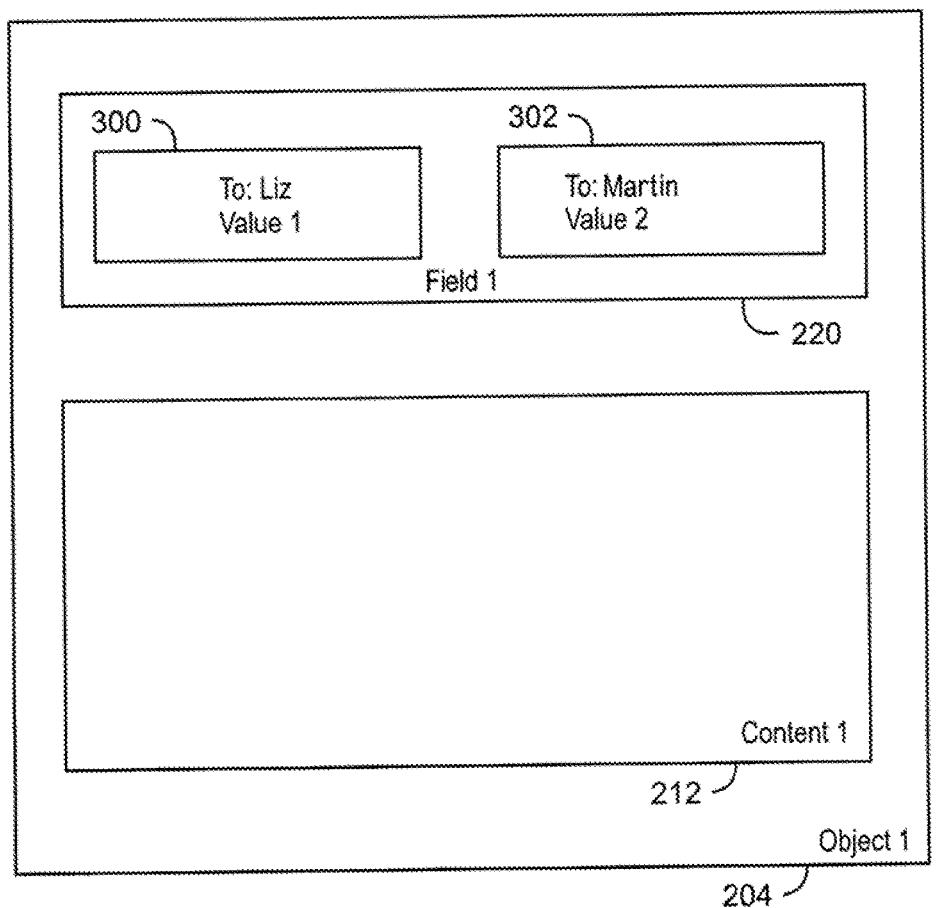
FIG. 3 shows a block diagram of an example object of a repository.

FIG. 3 shows a block diagram of an example object of a repository. Like items are as described in FIG. 1 and FIG. 2. As illustrated in FIG. 3, object 1 204 may include field 1 220 that includes multiple values (value 1 300 and value 2 302). In one example, the field may be a "To:" field that may indicate users initially to be sent object 1. As illustrated, Field 1 220 may include both Value 1 300 "To: Liz" and Value 2 302 "To. Martin". These two values need not be alphanumeric names but may also be any other data value suitable for a type of field. User values may include users that are groups of users. The repository information archive may calculate a user relationship number to indicate the frequency a first user and second users are both associated with the same object. The repository information archive may calculate a user-value relationship number to indicate the frequency a user identity may be associated with a particular value that may exist in another field of an object. The repository information archive may calculate a value-value relationship number to indicate the frequency a first value and a second value found in fields of an object are both associated with the same object.

In an example, a repository analyzer 112 may analyze multiple values within Object 1 204 and produce a count of the frequency of each value's appearance in various fields 220, 222, 224. In an example, this may include calculating the frequency a user value may be included in different types of fields 220, 222, 224 such as the "sent to:" and "to:" fields. In an example, a type of field may be based on the value contained within the field rather than explicit designation.

In an example, the repository analyzer 112 may be used by a computing device 101 to find correlations between users and fields not including user values, such as a "subject" field. In an example, the repository analyzer 112 may recognize that user values—Value 1 300 "To: Liz" and Value 2 302 "To: Martin"—were both included in Object 1 204. In this example, the repository analyzer 112 may also correlate these values to a "subject" of Object 1, and use this information to return objects results with similar or related subjects in response to queries, or in query interpretation.

Figure 4:
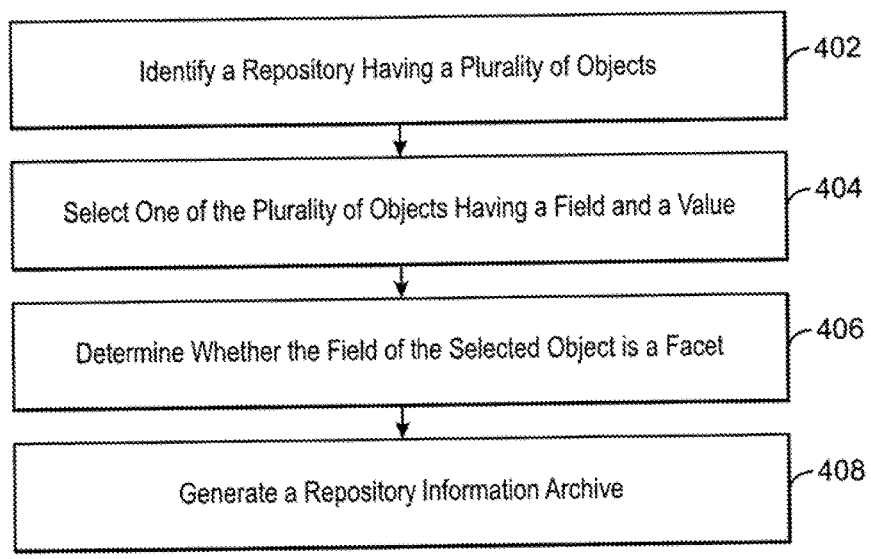
FIG. 4 shows a block diagram illustrating an example method of generating a repository information archive.

FIG. 4 shows a block diagram 400 illustrating an example method of generating a repository information archive. The method begins at block 402 where a repository with a plurality of objects may be identified. The repository may include multiple objects where each object may have multiple fields, and where each field has multiple values.

At block 404, a plurality of objects having a field and a value are selected. In addition to the general field properties designated by the repository, repository analysis may discover additional properties about every object and field rather than only obtaining repository provided structure information.

At block 406, it may be determined whether or not the selected object may be a facet. In an example, a field may be a facet if it has a limited set of possible values and it can be defined as such throughout the repository. In some cases, even if the field does not qualify as a facet, or when not explicitly defined as such, a repository analyzer may search for actual instances of a field throughout the repository. Depending on what the repository analyzer finds, a field may still be regarded as a facet if the values are used in a limited way. With each newly identified facet in a repository, the precision of queries may be increased as the ability to restrict a query by certain values limits irrelevant responses to queries which lack that certain value. In an example, the probability that a field qualifies as a facet may be based on an analysis of the repository to find if, and to what extent the values of the particular field are limited. In completely limited value fields, the probability that the field may be categorized as a facet are much higher than if there are fewer limitations on the number of values repeated in the repository.

At block 408, a repository information archive may be generated from all previous information used, gathered, and calculated from the analysis performed in this method. This generation may include the designation of if a field qualifies as a facet, or any other calculation from other steps in the analysis method. In an example, the analysis may be static in its performance prior to any queries being executed on the repository. In an example, if new information may be added to the repository after a repository analysis may be run, the repository analyzer may be rerun to generate an updated repository information archive. In an example, the analysis of the repository omits analysis of the content of an object and instead analyzes only the fields to increase precision of queries.

It will be appreciated that the embodiments described above and illustrated in the drawings represent only a few of the many ways of implementing embodiments of the present invention. The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., repository analyzer etc.). These systems may include any types of monitors and input devices (e.g., keyboard, mouse, voice recognition, etc.) to enter and/or view information.

It is to be understood that the software (e.g., the repository analyzer) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., the repository analyzer) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., objects, fields, and values). The database system may be implemented by any number of any conventional or other databases, data stores or storage structures (e.g., files, databases, data structures, data or other repositories, etc.) to store information (e.g., objects, fields, and values). The database system may be included within or coupled to the server and/or client systems. The database systems and/or storage structures may be remote from or local to the computer or other processing systems, and may store any desired data (e.g., objects, fields, and values).

The present invention embodiments may employ any number of any type of user interface (e.g., Graphical User Interface (GUI), command-line, prompt, etc.) for obtaining or providing information (e.g., objects, fields, and values), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++, JavaScript, objective C and C#, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
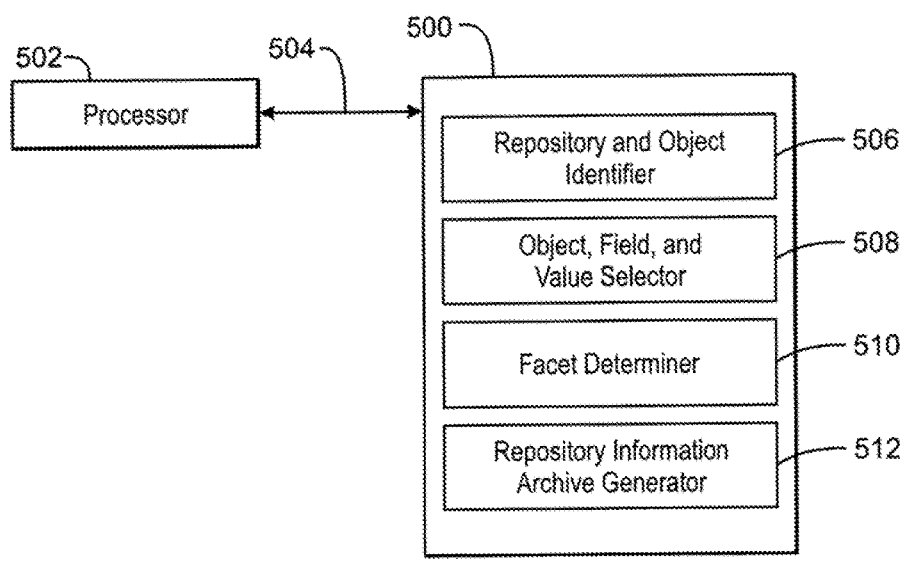
FIG. 5 shows a block diagram depicting an example of a tangible, non-transitory computer-readable medium that can be used to generate a repository information archive.

FIG. 5 shows a block diagram depicting an example of a tangible, non-transitory computer-readable medium 500 that can be used to generate a repository information archive. The tangible, non-transitory, computer-readable medium 500 may be accessed by a processor 502 over a computer bus 504. Furthermore, the tangible, non-transitory, computer-readable medium 500 may include computer-executable instructions to direct the processor 502 to perform the steps of the current method.

The various software components discussed herein may be stored on the tangible, non-transitory, computer-readable medium 500, as indicated in FIG. 5. For example, a repository and object identifier module 506 may be configured to identify a repository and objects and object-models therein. An object, field, and value selector module 508 may also be configured to select an object, field, and value from a plurality of those items within a repository. A facet determiner module 516 may determine for each field selected whether or not that field qualifies as a facet or not. A repository information archive generator module 512 may generate a repository information archive based on information gathered during analysis of a repository by the tangible, non-transitory, computer-readable medium 500.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations may be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for analyzing a repository, comprising:
    obtaining a list of known persons in a repository based on objects, users, and groups within the repository;
    selecting one of the objects having a field and a value;
    determining attributes of the field of the selected object, wherein the attributes include the field being searchable, the field containing special values, and the field being a facet, wherein the field is defined as a facet based on a probability that the field of the selected object has a limited number of values;
    counting a number of documents associated with each property retrieved from the repository;
    generating a repository information archive to comprise:

a persons matrix indicating for each person a list of contacts;

a relationship between the selected object and at least one other object;

statistics and counts related to properties in the objects; and an indication of the field of the selected object being a facet and a distribution of values in that facet; and processing a natural language query to retrieve information from the repository by:

converting the natural language query to a structured query based on the repository information archive, wherein the structured query is restricted to certain values based on determined facets within the repository information archive; and executing the structured query against the repository to retrieve the information.

2. The method of claim 1, wherein the probability is determined by comparing a percentage of repeated field values to a configurable threshold percentage.

3. The method of claim 1, wherein the field of the selected object is determined as a facet based on the field being explicitly identified as a facet.

4. The method of claim 1, wherein the field is a meta-data field.

5. The method of claim 1, wherein the value is a user identity, and wherein the repository information archive includes a field-type of the field of the selected object.

6. The method of claim 1, wherein the repository information archive is to comprise a first user identity, a second user identity, and a calculated user relationship number to indicate a frequency the first user identity and the second user identity are both associated with the selected object.

7. The method of claim 1, wherein the repository information archive is to comprise a first user identity, a second user identity, and a calculated user-value relationship number to indicate a frequency the first user identity and the second user identity are both associated with the value.

8. The method of claim 1, wherein the repository information archive comprises a search-field indicator to indicate when the field of the selected object is searchable.

9. The method of claim 1, wherein the repository information archive comprises a first value, a second value, and a calculated value-value relationship number to indicate a frequency the first value and the second value are both associated with the selected object.

\* \* \* \* \*